INVENTOR
N. P FLEMING
BY R. O. Nimtz
ATTORNEY

Nov. 29, 1966 N. P. FLEMING 3,288,944

APPARATUS TO AUDIBLY IDENTIFY INDIVIDUAL CONDUCTORS IN A MULTICONDUCTOR CABLE

Filed Oct. 10, 1963 3 Sheets-Sheet 2

Nov. 29, 1966 N. P. FLEMING 3,288,944

APPARATUS TO AUDIBLY IDENTIFY INDIVIDUAL CONDUCTORS IN A MULTICONDUCTOR CABLE

Filed Oct. 10, 1963 3 Sheets-Sheet 3

3,288,944

APPARATUS TO AUDIBLY IDENTIFY INDIVIDUAL CONDUCTORS IN A MULTICONDUCTOR CABLE

Norman P. Fleming, Los Angeles, Calif., assignor to American Telephone and Telegraph Company, New York, N.Y., a corporation of New York Filed Oct. 10, 1963, Ser. No. 315,130
11 Claims. (Cl. 179—175.3)

This invention relates to the identification of conductors in a multiconductor cable and, more particularly, to the automatic identification of conductor pairs in a telephone exchange cable.

A telephone cable used to connect subscribers at some remote location to a central office is generally made up of a large number of insulated pairs of conductors, which are twisted together. These conductors are all contained within a single protective sheath. Each of the conductor pairs connects a particular subscriber to a terminal on a main frame at the central office. Each conductor pair at the end of a cable in the field must, therefore, be identified in terms of its corresponding connection to the main frame at the central office.

Identification of the conductor pairs is, at present, conducted manually. Two workmen are stationed, respectively, at the central office and the field ends of the cable. The man in the central office applies an audible signal to each of the conductor pairs and communicates the identity of each energized pair to the man in the field at the time the signal is applied. The man in the field has an electrical probe connected to an audio detector. As the man in the field is informed as to the identity of an energized pair, he manually scans the conductor pairs of the cable to find the energized pair. He puts an identification marker on that pair and notifies the man at the central office of the identification. This procedure is continued until all of the conductor pairs have been identified. Apparatus to perform this type of identification is disclosed in the Fisher-Parker Patent 2,133,384, issued October 18, 1938.

There also presently exists an identification system that permits a single operator to identify the conductor pairs. Such a system usually comprises some dial pulse controlled electromechanical selecting means to allow the operator at the field location of the multiconductor cable to apply a signal tone at the central office to any selected conductor pair in the cable. The operator then manually scans the conductor pairs at the field end of the cable until he locates the one that is energized. Such identification systems are disclosed in Lowman Patent 2,799,739, issued July 16, 1957, and Meanley Patent 2,806,995, issued September 17, 1957.

Another identification system to permit a single operator to identify conductor pairs utilizes an audible signal, applied by the operator at the field location to a conductor pair selected at random, to operate electromechanical switching means at the central office termination of the cable. This central office electromechanical switching means indicates a number corresponding to the identity of the conductor pair. Electromechanical switching means at the field location, which are controlled by the central office switching apparatus, indicates the same identifying number to the operator. Such an identification system is disclosed in the patent application of J. F. L. Palmer, Serial No. 160,785, filed December 20, 1961, and assigned to applicant's assignee.

In the above-described prior identification systems used to identify conductor pairs in multiconductor cables, the methods used to identify conductor pairs are either too slow and cumbersome or else require the operator to perform a large number of duties in the operation of fairly complicated equipment with a high probability of error. The present invention identifies individual conductor pairs automatically with a minimum of skill and effort required on the part of the operator.

It is an object of the present invention to reduce the time consumed in and improve the efficiency of conductor pair identification.

It is another object of the invention to automatically identify any conductor pair of a cable at its field termination.

It is yet another object to identify conductor pairs with only a single operator to control the apparatus.

It is still another object of the invention to identify conductor pairs with a high degree of precision and accuracy.

It is a further object to audibly identify individual conductor pairs, wherein the apparatus contains prerecorded numerical designations which are announced to the operator at the field location to identify a particular conductor pair.

In accordance with the present invention, a single operator at the field location of a multipair cable comprising a plurality of conductor pairs applied a direct-current energizing signal to one of the conductor pairs selected at random. This signal is transmitted by the conductor pair to the central office where all the conductor pairs terminate in a translator.

The translator directs the energizing signal on a particular conductor pair to particular ones of a plurality of gating circuits. The gatting circuits enable the output of selected portions of a continuously scanned magnetic recording medium containing prerecorded numerical designations. The gated output of the recording is transmitted via a preselected control conductor pair to a loudspeaker at the field location of the multipair cable.

The invention will be readily understood from the following description when taken together with the accompanying drawings in which.

Figure 1:
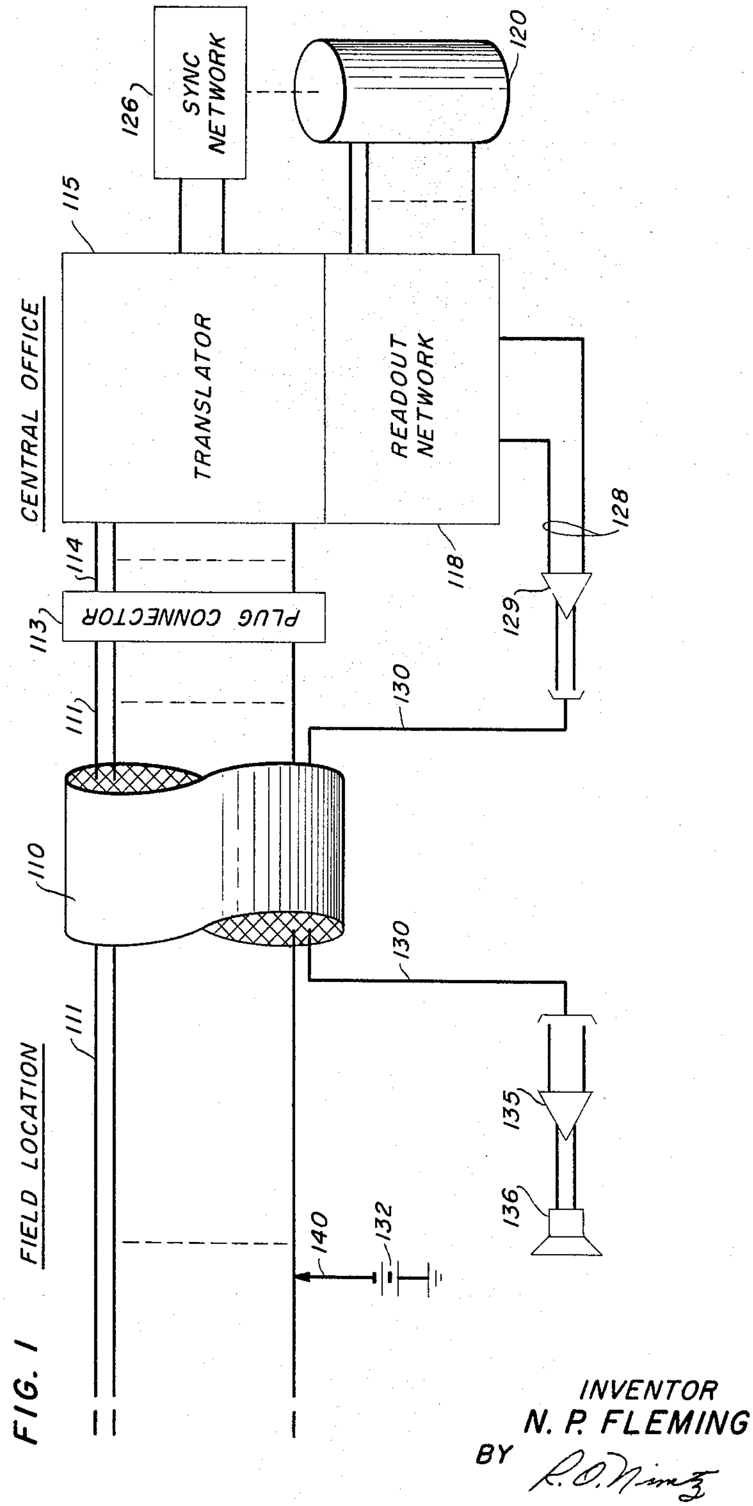
FIG. 1 is a block diagram of a specific embodiment of the invention.

Referring now to FIG. 1, a multiconductor cable 110 comprising a plurality of insulated twisted wire pairs 111, henceforth called conductor pairs, is shown with its opposite terminations at a field and a central office location. Although the sizes of multiconductor cables are numerous, for the purposes of illustration of the invention, it is assumed that the cable contains one hundred conductor pairs, plus an additional easily identified spare conductor pair 130 which is used as a control pair to connect identifying apparatus at the field location to the identifying apparatus at the central office.

One wire of each conductor pair is designated as the ring and the other is designated as the tip in accordance with well-known telephony terminology. The conductor pairs 111 are shown as extending beyond the protective sheath of the cable and then terminating at each end of the cable 110.

The operator at the field location commences operation of the apparatus by attaching a connector 140 to one of the conductor pairs 111 selected at random. The connector may comprise an alligator type clip arrangement or any other connecting means which can be used to apply a direct current signal to an insulated wire. It is assumed for the purposes of discussion that the conductor pair selected is the conductor pair identified as number forty-eight.

The attachment of the connector 140 to a conductor pair 111, selected at random, applies to that pair a direct-current energizing signal from the battery 132. For purposes of illustration, a negative direct-current signal is used although the equipment could be arranged to just as easily utilize a positive direct-current signal without departing from the spirit and scope of the invention.

This direct-current signal is transmitted over the energized conductor pair 111 to the central office location. This signal is picked up by a plug connector 113, which connects the central office identifying apparatus to conductor pairs of the cable via the main distributing frame at which the conductor pairs terminate. This signal is applied, via one of the leads 114, to a translator 115 The translator 115 is described in detail with reference to FIG. 2.

Briefly, the translator 115 operates to translate a direct-current signal on either the tip or ring of any one of the input leads 114 to an energization signal applied to a particular two of a plurality of discrete operable devices. The selected pair of operable devices are unique to the energized conductor. These discretely operable devices, which are described with reference to FIG. 2, control switching means, contained in the readout network 118. This switching means enables the transmission of information contained in the magnetic recording medium 120. A synchronizing network 126, described with reference to FIG. 2, controls the timing and sequence of the operation of the readout network by synchronizing it with the scanning of the magnetic recording medium. The details of operation will be disclosed with reference to FIG. 2.

The magnetic recording medium 120 is a source of prerecorded numerical designations which, in the illustrative embodiment, comprise audible recordings of the numerals "zero" through "nine." An additional recorded signal tone is added to the recording medium 120 for a purpose which is subsequently explained. The recording medium may be embodied in a magnetic drum, tape, or disc, and is shown as a drum only for purposes of illustration.

The drum 120, shown in the illustrative embodiment, has eleven recording bands. A band is provided for each of the ten digits and an additional band for the signal tone. Each band of the drum is continuously scanned by a readout mechanism. The readout mechanisms scanning the digit bands are controlled by the readout network 118.

The numerical identification is transmitted by the readout network 118 via the conductor pair 128 to the amplifier 129. A special tone signal is superimposed on the most significant digit in a manner to be described with reference to FIG. 2. The readout network, assuming that the probe 140 is connected to the conductor pair number forty-eight, will enable the transmission of an audible "four" followed by an audible "eight" on the wire pair 128. A signal tone is superimposed on the tens digit "four" to identify it as such.

The transmitted audible digit is amplified by an audio amplifier 129 and transmitted to the field location, via the previously selected spare conductor pair 130. The alternately arriving units and tens digits are further amplified by the amplifier 135 at the field location and are conveyed to the operator at the field via a loudspeaker 136.

The operator, having heard the audible identification of "four-eight," removes the connector 140 from the conductor pair so energized. The removal of this source of energy deactivates the discretely operable devices in the translator 115 thereby disabling the audible readout. The operator, by connecting the connector 140 to another unknown conductor pair, causes a similar identification process to be repeated.

Figures 2, 2A:
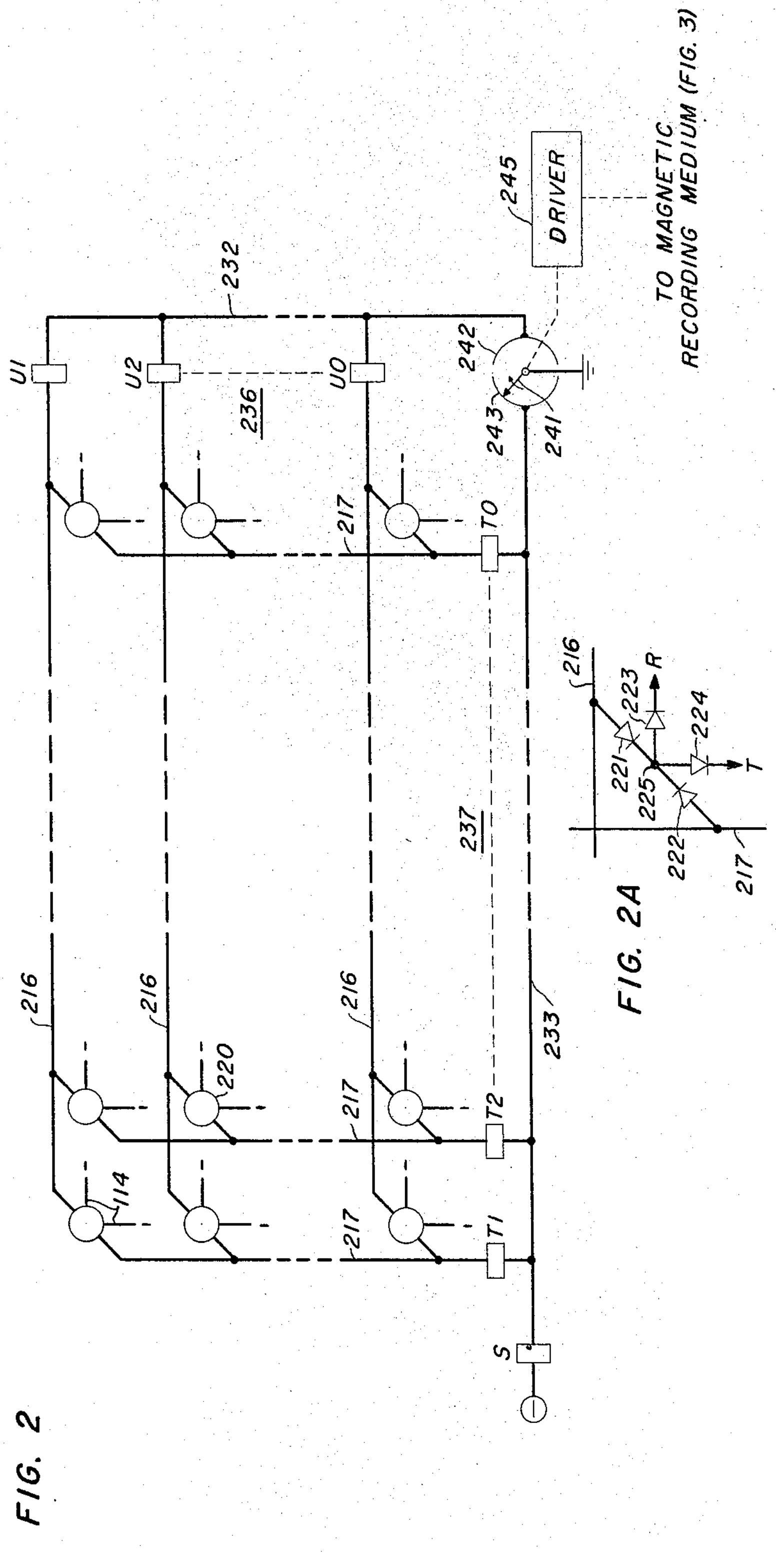
FIGS. 2 and 3 are schematic circuit diagrams disclosing particular circuit details of the illustrative embodiment of the invention shown in FIG. 1.

Referring now to FIG. 2, a translator circuit is shown which is suitable for use in the present invention as the translator 115 of FIG. 1. The circuit consists of an array of units and tens output leads, 216 and 217, crisscrossing in a rectangular pattern. The units output leads 216 and the tens output leads 217 are interconnected at each intersection by a diode gating network 220 shown in detail in FIG. 2A. The diode gating network 200 comprises, as shown in FIG. 2A, for diodes joined at a common node 225.

Each individual one of the output leads 216 and 217 includes the winding of a discretely operable device, which may comprise an electromagnetic relay as shown in the illustrative embodiment. The relays are separated, as are the output leads, into "units" and "tens" groups 236 and 237, respectively. The "tens" relays are designated T1, T2, . . . T0, the number designating the identification digit with which the particular relay is associated. The "units" relays are designated in a similar manner U1, U2, . . . U0.

Figure 3:
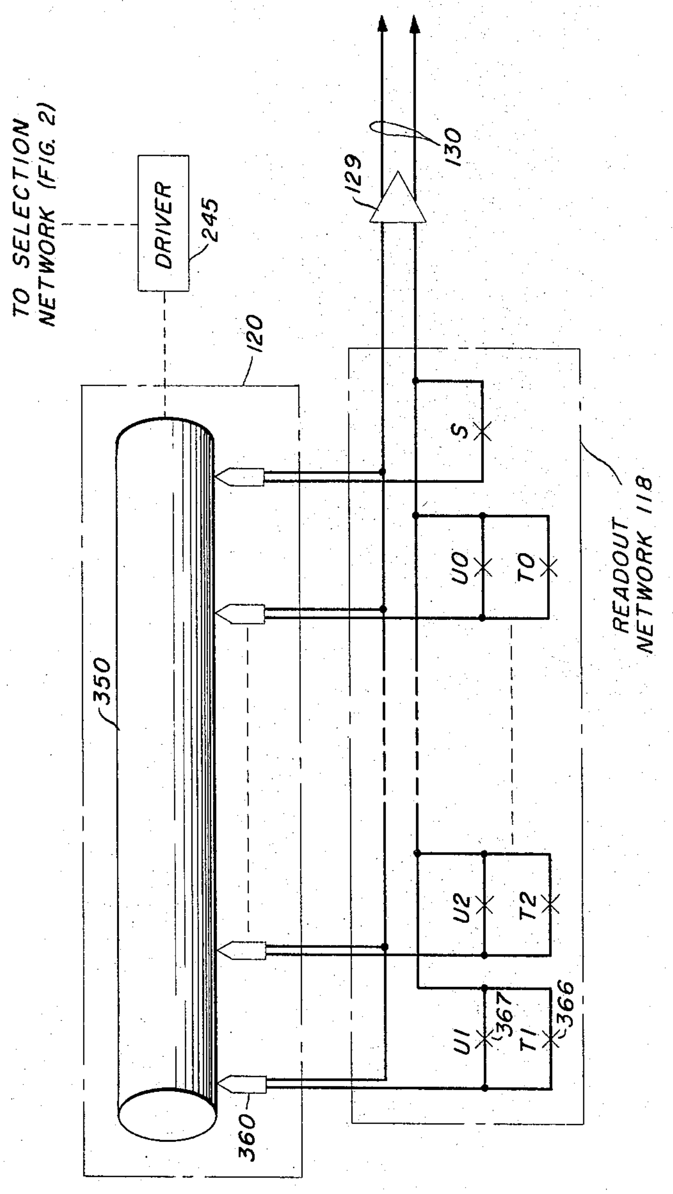

The relays of the circuits are shown in a detached-contact-type schematic circuit drawing. The coil windings are shown in FIG. 2; their contacts are shown in FIG. 3. A general description and explanation of this type of notation is presented by F. T. Meyer in an article entitled "An Improved Detached-Type of Schematic Circuit Drawing" in the September 1955, issue of the AIEE Transactions on Electronics and Communications, volume 74, part 1, pp. 505–513.

The common devices 232 and 233, connected to terminations of the relay windings 236 and 237, respectively, are connected to two commutator segments 242 and 243; which are periodically connected through a rotating brush 241 to ground. Each bank of relays has its winding connected to ground during the period that the rotary brush 241 is in contact with the segment connected to that bank. During this period any relay in that bank may be energized by an energizing signal applied to the input of the translator, via leads 114.

The rotation of the rotary contactor 241 is controlled by a driving means 245 which may comprise a synchronous motor or other constant speed means. The driving means also simultaneously controls the scanning rate of the magnetic recording medium 350. The circuit of the relay winding in each bank of relays is closed a sufficient length of time to transmit one complete numerical digit. Associated with the bank of "tens" relays is an independently energized relay, designated as S, which serves to superimpose a signal tone on numerical identification digits enabled by the "tens" relays.

In operation, assuming that conductor pair number eleven is energized, a negative direct-current signal is applied to the cathode of diode 223 or 224 (FIG. 2A), through one pair of leads 114, connected to the ring and tip of the energized conductor pair 111. This direct current biases diodes 223 and 224 into a conducting state. The negative signal is applied thereby to the node 225 and biases both the diodes 221 and 222 into a state of conduction. This enables the energization of the units output lead 216 connected to relay U1, and the tens output lead 217 connected to relay T1. The above-described circuit is only one of many translating circuits which are suitable for use in the present invention. Various other means will be apparent to those skilled in the art.

Referring now to FIG. 3, the magnetic recording medium 120, and the circuitry of the readout network 118, all shown in FIG. 1, are disclosed in greater detail. The circuitry of the readout network 118 comprises the relay contacts of the two independent sets of discretely operable devices 236 and 237, shown in FIG. 2.

The magnetic recording medium 120 comprises, for example, a magnetic drum 350 containing ten bands of voice recorded numerical designations and one additional band containing a signal tone. A readout mechanism 360 is supplied for each individual band of the drum 350. The readout is enabled by the closing of either the units or tens relay contacts 366 or 367, respectively, which are situated in parallel to each other. The relay contacts, when closed, complete the circuit necessary to transmit signals from the readout mechanism 360. The speed at which the drum is scanned (i.e., its rotational speed) is controlled by the driver 245 which synchronizes the action of the relays with the time period of readout. The output of the readout apparatus is applied to the audio amplifier 129 which amplifies and transmits the voice recorded numeral to the control pair 130.

While the conductor pair identification system of the present invention has been described in connection with identifying conductors in a telephone system, it is to be understood that this embodiment is simply illustrative of the many possible arrangements which can represent applications of the principles of the invention. The other applications can readily be devised by those skilled in the art without departing from the spirit and scope of the invention.

What is claimed is:

1. Apparatus to identify conductors of a multiconductor cable comprising, a source of energizing potential at one end of said cable, means to apply an energizing signal from said energizing source to an individual one of said conductors, an audible recording medium at the other end of said cable, said audible recording medium containing prerecorded numerical designations to identify said conductors, switching means responsive to an energizing signal on one of said conductors to select and transmit that portion of said prerecorded numerical designations containing the identity of the conductor so energized, and transmission means to convey said audible identity to said one end of said cable.

2. The identifying apparatus in accordance with claim 1 further including an audible announcement device at said one end of said cable to indicate said conveyed audible identity.

3. The identifying apparatus in accordance with claim 1, wherein said switching means includes means to gate selected portions of said prerecorded numerical designations, and means responsive to the signal from an energized conductor to selectively enable said gating means.

4. Apparatus to identify individual conductors in a multiconductor cable interconnecting a central office with some remote location comprising, a source of energizing potential at said remote location, means to apply said energizing potential to one of said individual conductors at said remote location, translation means at said central office to detect signals on any energized conductor and convert each signal so detected into a signal on a pattern of output leads of the translator unique to individual ones of the energized conductors, an audible recording medium, gating means to select various recorded portions of said recording medium in response to said signal pattern, means to transmit said recorded portion of said remote location, and audible readout means at said remote location.

5. The identifying apparatus in accordance with claim 4 wherein said recording medium comprises a source of prerecorded audible identification announcements, said announcements comprising the basic digit values of some preselected number system, said gating means selectively enabling said digit values in the proper sequence, and means to identify the digit significance of said digit values.

6. The identifying apparatus in accordance with claim 5 wherein said means to identify digit significance comprises means to superimpose a signal tone upon the most significant digit value.

7. The identifying apparatus in accordance with claim 5 wherein said gating means comprises means to alternately enable two groups of discretely operable devices which enable the transmission of said digit values.

8. In combination, a multiconductor cable interconnecting a central office to some remote location, a source of energizing potential at said remote location, means to apply an energizing signal from said source to individual ones of the conductors comprising said multiconductor cable, a recording medium, a plurality of switching means at the central office termination of said cable to detect a signal on an energized conductor and enable the transmission of a plurality of prerecorded audible digits corresponding to the identity of the energized conductor, means to superimpose a prerecorded signal tone upon the most significant of said enabled plurality of identity digits, selection means to sequentially apply said enabled plurality of identity digits to transmission means to said remote location, and audible readout means at said remote location.

9. The identification system in claim 8 further including translation means to address unique and distinct sections of said switching means in response to signals on individual ones of said conductors.

10. The identification system in claim 8 wherein said switching means is partitioned into independent switching circuits to individually enable prerecorded digits of sequentially arranged orders of significance and means to cyclically repeat said sequentially arranged orders.

11. A conductor pair identification system for a cable including a plurality of conductor pairs and having first and second terminations, said system comprising means at said first termination for applying a signal to a randomly selected one of said conductor pairs to be identified, identification storage means at said second termination, translation means at said second termination serving in response to the applied signal received at said second termination to gate out identification data stored in said storage means corresponding to said randomly selected conductor pair, means to transmit said identification data to said first termination, and means at said first termination for indicating said identification data.

References Cited by the Examiner

UNITED STATES PATENTS 2,869,077 1/1959 Houk ---------- 179—175.25 X

KATHLEEN H. CLAFFY, *Primary Examiner.*

S. J. BOR, F. N. CARTEN, *Assistant Examiners.*